United States Patent
Robert Jose et al.

(10) Patent No.: US 12,205,585 B2
(45) Date of Patent: Jan. 21, 2025

(54) SYSTEMS AND METHODS FOR LOCAL AUTOMATED SPEECH-TO-TEXT PROCESSING

(71) Applicant: Adeia Guides Inc., San Jose, CA (US)

(72) Inventors: Jeffry Copps Robert Jose, Tamil Nadu (IN); Aashish Goyal, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 146 days.

(21) Appl. No.: 17/619,994

(22) PCT Filed: Dec. 10, 2019

(86) PCT No.: PCT/US2019/065383
§ 371 (c)(1),
(2) Date: Dec. 16, 2021

(87) PCT Pub. No.: WO2021/118531
PCT Pub. Date: Jun. 17, 2021

(65) Prior Publication Data
US 2022/0301561 A1    Sep. 22, 2022

(51) Int. Cl.
*G10L 15/22*   (2006.01)
*G10L 15/06*   (2013.01)
(Continued)

(52) U.S. Cl.
CPC ............ *G10L 15/22* (2013.01); *G10L 15/063* (2013.01); *G10L 15/26* (2013.01); *G10L 15/30* (2013.01);
(Continued)

(58) Field of Classification Search
CPC ....... G10L 15/22; G10L 15/063; G10L 15/26; G10L 15/30; G10L 15/32; G10L 2015/0635; G10L 2015/223
See application file for complete search history.

(56) References Cited

U.S. PATENT DOCUMENTS 6,185,535 B1   2/2001   Hedin et al.
6,901,366 B1   5/2005   Kuhn et al.
(Continued)

FOREIGN PATENT DOCUMENTS

| CN | 100405370 C | * | 7/2008 | ............ G10L 15/30 |
| CN | 104769668 A | * | 7/2015 | ............ G10L 15/02 |

(Continued)

OTHER PUBLICATIONS

PCT International Search Report and Written Opinion for International Application No. PCT/US2019/065383, dated Aug. 12, 2020 (16 pages).

(Continued)

*Primary Examiner* — Mohammad K Islam
(74) *Attorney, Agent, or Firm* — Haley Guiliano LLP

(57) ABSTRACT

Systems and methods are described herein for enabling, on a local device, a voice control system that limits the amount of data needed to be transmitted to a remote server. A data structure is built at the local device to support a local speech-to-text model by receiving a query and transmitting, to a remote server over a communication network, a request for a speech-to-text transcription of the query. The transcription is received from the remote server and stored in the data structure at the local device in association with an audio clip of the query. Metadata describing the query is used to train the local speech-to-text model to recognize future instances of the query.

19 Claims, 7 Drawing Sheets

(51) Int. Cl.
  *G10L 15/26* (2006.01)
  *G10L 15/30* (2013.01)
  *G10L 15/32* (2013.01)

(52) U.S. Cl.
  CPC ...... *G10L 15/32* (2013.01); *G10L 2015/0635* (2013.01); *G10L 2015/223* (2013.01)

(56) References Cited

U.S. PATENT DOCUMENTS

| | | | |
|---|---|---|---|
| 7,519,534 | B2 | 4/2009 | Maddux et al. |
| 10,672,391 | B2 | 6/2020 | Maergner et al. |
| 10,854,196 | B1* | 12/2020 | Parker ............... G06Q 10/10 |
| 11,031,010 | B2* | 6/2021 | Ji ........................ G10L 15/22 |
| 11,715,466 | B2 | 8/2023 | Aher et al. |
| 11,721,332 | B1* | 8/2023 | Mokady ........... G06Q 30/0641 |
| | | | 704/275 |
| 2002/0091515 | A1 | 7/2002 | Garudadri |
| 2003/0120493 | A1 | 6/2003 | Gupta |
| 2006/0004743 | A1 | 1/2006 | Murao et al. |
| 2007/0233487 | A1 | 10/2007 | Cohen et al. |
| 2008/0154611 | A1* | 6/2008 | Evermann ............ G06F 16/957 |
| | | | 707/E17.119 |
| 2010/0076763 | A1 | 3/2010 | Ouchi et al. |
| 2010/0250250 | A1 | 9/2010 | Wiggs |
| 2011/0054900 | A1 | 3/2011 | Phillips et al. |
| 2012/0179457 | A1* | 7/2012 | Newman ............... G10L 15/30 |
| | | | 704/E15.047 |
| 2013/0124207 | A1* | 5/2013 | Sarin .................... G06F 3/167 |
| | | | 704/E11.001 |
| 2014/0006028 | A1 | 1/2014 | Hu |
| 2015/0154959 | A1 | 6/2015 | Stonehocker et al. |
| 2019/0074003 | A1 | 3/2019 | Guthery |
| 2019/0392836 | A1* | 12/2019 | Kang ..................... G06F 40/30 |
| 2020/0005789 | A1* | 1/2020 | Chae ..................... G10L 15/22 |
| 2020/0118544 | A1* | 4/2020 | Lee ....................... G10L 15/063 |
| 2020/0312329 | A1 | 10/2020 | Mohajer et al. |
| 2021/0005190 | A1* | 1/2021 | Ji .......................... G06F 3/167 |
| 2021/0125605 | A1* | 4/2021 | Lee ....................... G06F 40/30 |
| 2021/0183366 | A1* | 6/2021 | Reinspach ............ G10L 15/02 |
| 2022/0301562 | A1 | 9/2022 | Robert Jose et al. |
| 2022/0301567 | A1* | 9/2022 | Girardier .............. H04W 4/80 |
| 2024/0038221 | A1* | 2/2024 | Novitasari ............ G10L 15/20 |

FOREIGN PATENT DOCUMENTS

| | | | | |
|---|---|---|---|---|
| CN | 106710587 | A | * 5/2017 | ............ G10L 15/26 |
| EP | 3407348 | A1 | 11/2018 | |
| FR | 3011101 | A1 | * 3/2015 | ........... G09B 21/001 |
| JP | 4987203 | B2 | * 7/2012 | ........ G06F 16/24522 |

OTHER PUBLICATIONS

PCT International Search Report and Written Opinion for International Application No. PCT/US2019/065394, dated Apr. 24, 2020 (15 pages).

U.S. Appl. No. 17/620,005, filed Dec. 16, 2021, Jeffry Copps Robert Jose.

* cited by examiner

| Sound File | Phonemes | Graphemes | Sequence | Transcription |
|---|---|---|---|---|
| "start" | S sound | S | S T AA R T | START |
| | T sound | T | | |
| | A sound | AA | | |
| | R sound | R | | |
| | T sound | T | | |
| "launch Netflix" | L sound | L | L AO N CH N EH T F L IH KS | LAUNCH NETFLIX |
| | A sound | AO | | |
| | U sound | | | |
| | N sound | N | | |
| | C sound | CH | | |
| | H sound | | | |
| | N sound | N | | |
| | E sound | EH | | |
| | T sound | T | | |
| | F sound | F | | |
| | L sound | L | | |
| | I sound | IH | | |
| | X sound | KS | | |
| "record Seinfeld" | R sound | R | R AH K AO R D S AY N F EH L D | RECORD SEINFELD |
| | E sound | AH | | |
| | C sound | K | | |
| | O sound | AO | | |
| | R sound | R | | |
| | D sound | D | | |
| | S sound | S | | |
| | E sound | AY | | |
| | I sound | | | |
| | N sound | N | | |
| | F sound | F | | |
| | E sound | EH | | |
| | L sound | L | | |
| | D sound | D | | |

FIG. 4

SYSTEMS AND METHODS FOR LOCAL AUTOMATED SPEECH-TO-TEXT PROCESSING

CROSS-REFERENCE TO RELATED APPLICATIONS

This application is a national stage application under 35 U.S.C. § 371 of International Application PCT/US2019/065383, filed Dec. 10, 2019, which is hereby incorporated by reference herein in its entirety.

BACKGROUND

This disclosure relates to voice control systems and, in particular, implementations of voice control systems in low bandwidth environments.

SUMMARY

As part of the continuing development of personal electronic devices, such as smartphones and tablets, there has been an increase in the use of voice control systems that enable users to interact with various functions by processing a received voice input and translating it into data forming an executable command. As the number of functions that can be controlled through voice commands expands, more and more words need to be recognizable by the voice control system in order to affect the proper response to the voice command. Voice control systems recognizing only a few simple words can locally store data required to understand those specific words. Most current voice control systems, however, enable recognition of virtually any spoken word, and cannot locally store the data needed to understand all the words. Instead, such systems transmit the voice command to a remote server for transcription. This requires that the device at which the voice command is received have a network connection, and that the network connection have sufficient bandwidth to transmit the entire voice command to the remote server. As voice commands become more complex, the length of the voice command increases, and with it, the bandwidth needed to transmit the voice command to the remote server. Thus, a system is needed that can reduce the amount of data needed to reduce the burden on the transmission to the remote server.

Systems and methods are described herein for enabling, on a local device, a voice processing system that limits the amount of data needed to be transmitted to a remote server in translating a voice input into executable data. A local speech-to-text model is built at the local device by receiving a query via a voice-user interface of the local device (e.g., a microphone), and transmitting, to a remote server over a communication network, a request for a speech-to-text transcription of the query. When the transcription is received from the remote server, it is stored in a data structure, such as a table or database, at the local device. In some embodiments, the transcription is also added to or used to supplement or further train a neural network at the local device. An entry is added to the data structure that associates an audio clip of the query with the corresponding transcription. In some embodiments, a plurality of audio clips are associated with an entry. For example, each audio clip may correspond to a word or phoneme spoken in a different accent. Thus, the transcription of the particular query can be used in recognition of a query subsequently received via the voice-user interface of the local device. In some embodiments, the set of transcriptions stored at the local device is smaller than the set of transcriptions stored at the server. For example, a minimum set of transcriptions stored at the local device may be based on part of a subset of utterances that correspond to a set of commands and/or actions that the local device is configured to execute. Such a small set of transcriptions may be sufficient for applications that need interpret only a small universe of commands ("static entries" as discussed further below). This small set of locally stored transcriptions may better enable local processing of voice queries for devices having limited memory capacity.

In some embodiments, each entry in the data structure belongs to either a static set of entries or a dynamic set of entries. The static set of entries corresponds to functions executable by the local device. If the local device identifies, in the data structure, an action corresponding to the transcription that can be performed by the local device, the local device proceeds to perform the action. The dynamic set of entries corresponds to media content available from a content catalog, or other words or phrases that are not functions executable by the device. Such configuration of the data structure to include both static and dynamic entries strikes a balance between keeping the speech-to-text model small enough to implement locally, even in low-memory environments, by limiting the amount of voice queries that the model can be used to recognize and ensuring that the data structure supporting the model is sufficiently comprehensive to include entries enabling recognition of voice queries about the content catalog which may be frequently updated. If a set period of time has elapsed, the local device may update one or more dynamic entries in the table. The server is queried and identifies an update corresponding to the content catalog. The local device then updates the corresponding entries. Alternatively, an updated content catalog may be pushed by the server to the local device along with an updated set of dynamic entries to store in the table.

Entries in the data structure may include an audio clip that is mapped to a phoneme (a distinct unit of sound), which in turn is mapped to a set of graphemes (the smallest meaningful units of writing) representing each individual sound in the audio clip. The graphemes are mapped to a sequence that represents the sounds of the audio clip assembled into the full audio of the audio clip, and the sequence is mapped to the transcription.

To interpret a voice query received at the local device, the query is processed using the local speech-to-text model to generate a transcription of the query, which is then compared to the data structure to determine whether the data structure includes an entry that matches the query. If so, the corresponding action or content item is identified from the data structure. If the local speech-to-text model cannot recognize the query, the local device transmits a request for transcription to the server and stores the received transcription in the data structure as described above. The received transcription may also be used to further train the local speech-to-text model.

In some embodiments, the local device may split the query into individual words and determine if the data structure includes entries matching each word. The local device uses the transcription stored in the data structure for any word for which a matching entry is located and transmits requests to the server for transcriptions of any word for which the data structure does not include a matching entry.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which:

FIG. 4 is an exemplary data structure supporting a local speech-to-text model, in accordance with some embodiments of the disclosure;

DETAILED DESCRIPTION

Figure 1:
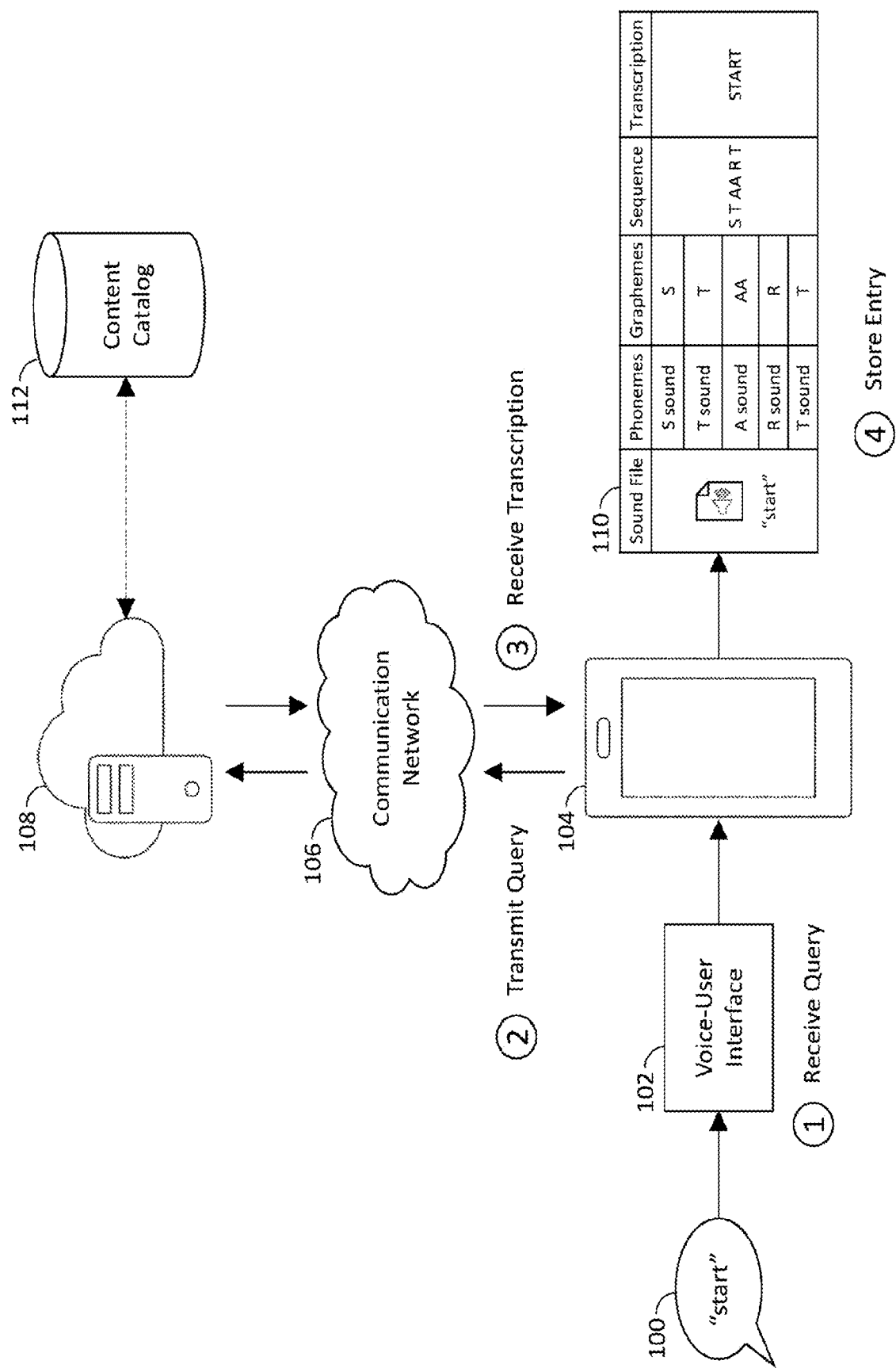
FIG. 1 shows an exemplary environment in which a data structure supporting a local speech-to-text model is built, in accordance with some embodiments of the disclosure.
Figure 2:
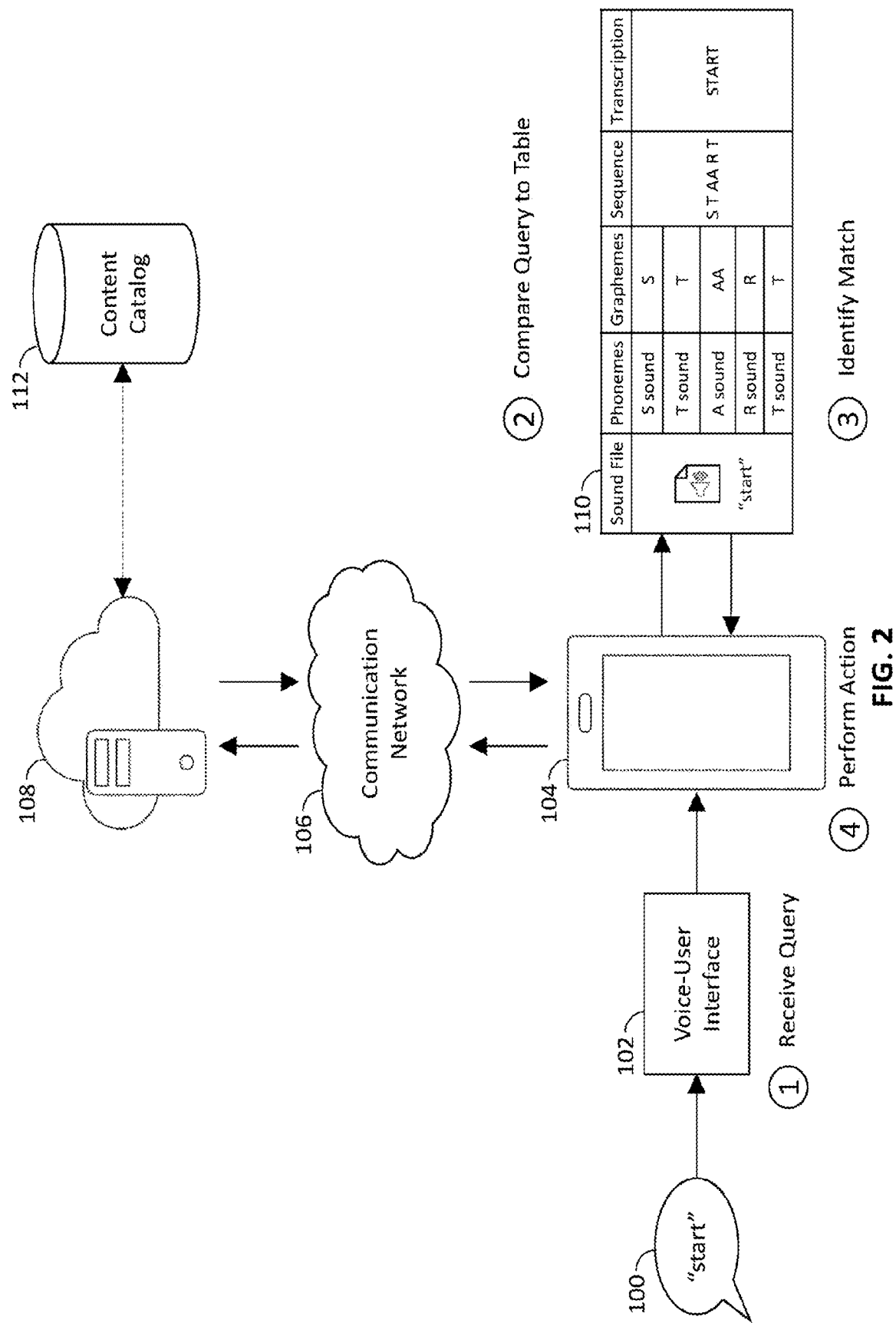
FIG. 2 shows an exemplary environment in which a voice query is interpreted, in accordance with some embodiments of the disclosure.

FIGS. 1 and 2 show an exemplary environment in which a data structure supporting a local speech-to-text model is built, and in which a voice query is interpreted using the local speech-to-text model, in accordance with some embodiments of the disclosure. Referring to FIG. 1, voice query 100 is received at voice-user interface 102. The voice query is converted at voice-user interface 102 to a signal that local device 104 can process. For example, voice-user interface may be a microphone that converts raw audio data representing the voice query to a digital audio signal for input into local device 104. Local device 104 transmits the query, via communication network 106, to server 108, where a transcription of the query is generated. Local device 104 receives the transcription back from server 108 and stores the transcription in data structure 110 for use by a local speech-to-text model in interpreting future voice queries. If needed, server 108 may query content catalog 112 to identify names of content items included in the query. Alternatively, a content provider may push updated content catalog data to local device 104, along with updated entries corresponding to items in the content catalog for storage in the data structure.

Referring to FIG. 2, in response to query 100 received at local device 104 via voice-user interface 102, local device 104 processes the query using a local speech-to-text model to generate a transcription of query 100. Local device 104 then compares the transcription of query 100 to data structure 110 to determine if an entry in data structure 110 matches query 100. If a match is identified, local device 104 determines if query 100 corresponds to an action that local device 104 can perform. If so, local device 104 performs the action.

It is noted that, in cases where the query consists of multiple words, some words of the query may be recognized by the local speech-to-text model and/or may have matching entries in data structure 110 while some do not. Local device 104 may process the query to isolate audio of each word and process each word separately using the local speech-to-text model. If any word is not recognized by the local speech-to-text model or does not have a matching entry in data structure 110, that portion of the query may be transmitted to server 108 for transcription as described above.

Figure 3:
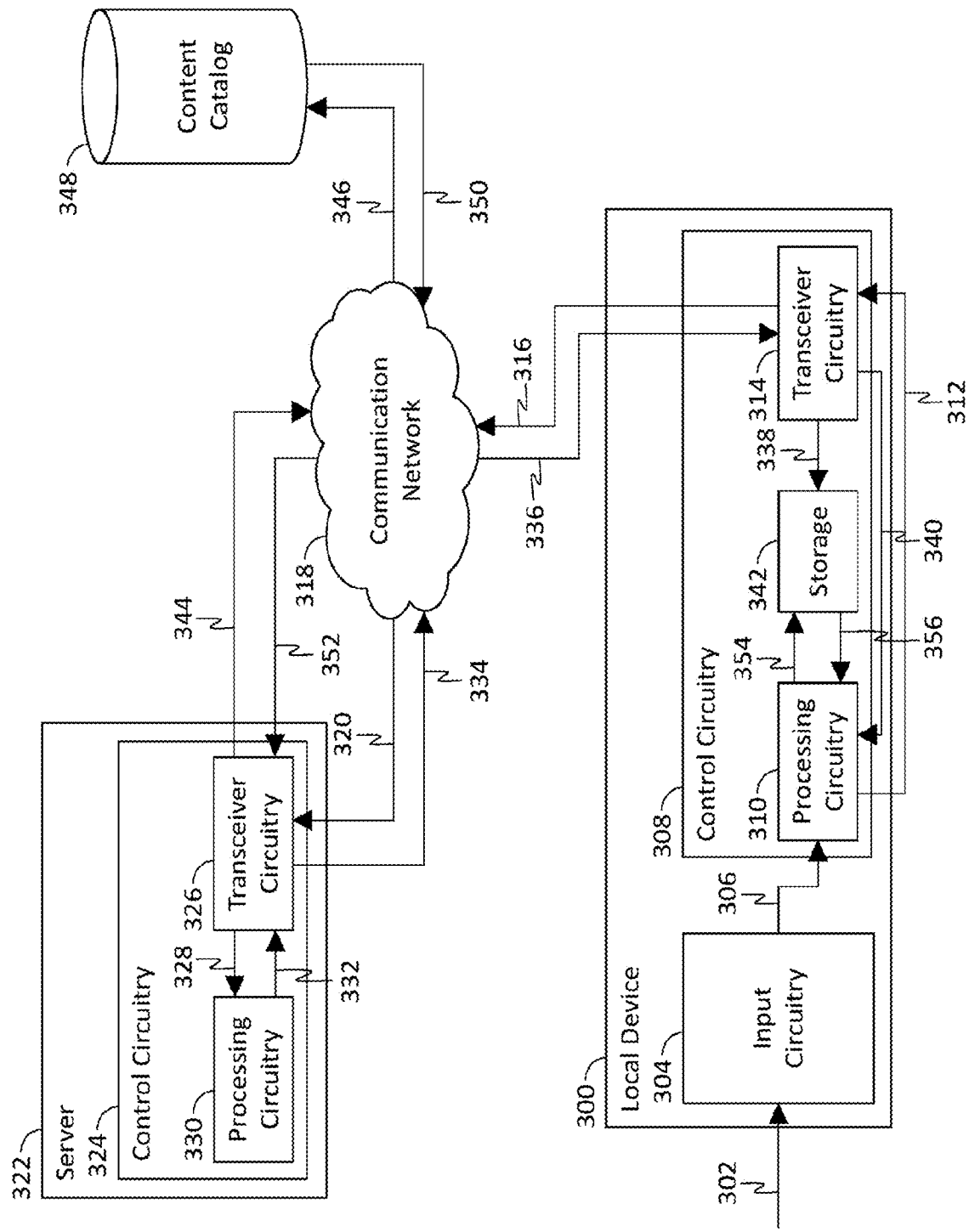
FIG. 3 is a block diagram representing devices, components of each device, and data flow therebetween for building a data structure to support a local speech-to-text model and interpreting a voice query, in accordance with some embodiments of the disclosure.

FIG. 3 is a block diagram representing devices, components of each device, and data flow therebetween for building a data structure to support a local speech-to-text model and interpreting a voice query, in accordance with some embodiments of the disclosure. Local device 300 (e.g., local device 104) receives 302 a voice query using input circuitry 304. Local device 300 may be any device for accessing media content or other types of data, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

The voice query may be received from a voice-user interface that is separate from local device 300, such as a microphone, voice-enabled remote control, or other audio capture device. Transmission of the voice query to local device 300 may be accomplished using a wired connection, such as an audio cable, USB cable, ethernet cable or the like attached to a corresponding input port at local device 300, or may be accomplished using a wireless connection, such as Bluetooth, WiFi, WiMax, GSM, UTMS, CDMA, TDMA, 3G, 4G, 4G LTE, or any other suitable wireless transmission protocol. Input circuitry 304 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WiFi, WiMax, GSM, UTMS, CDMA, TDMA, 3G, 4G, 4G LTE, or other wireless transmission protocols.

Once received, the query is transmitted 306 from input circuitry 304 to control circuitry 308. Control circuitry 308 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Input circuitry 304 may be integrated with control circuitry 308.

Control circuitry 308 comprises processing circuitry 310, which receives the query from input circuitry 304. Processing circuitry 310 may comprise audio conversion circuitry, natural language processing circuitry, or any other circuitry for interpreting voice queries, and may implement a local speech-to-text model. The local speech-to-text model may be a neural network model or machine learning model supplied to the local device by a remote server which is pre-trained to recognize a limited set of words corresponding to actions that the local device can perform. Processing circuitry 310 may implement a machine learning algorithm or other model for further training the local speech-to-text model to recognize additional words as needed.

The voice query may be received in a first format, such as a raw audio format or WAV file. Processing circuitry 310 may convert the query to a different format, such as MP3, M4A, WMA, or any other suitable file format. Such processing may reduce the amount of data needed to represent the audio of the query, thus reducing the amount of data needed to be transmitted to a server for transcription or stored in the data structure to support the local speech-to-text model, such as data structure 110.

To build the data structure 110, processing circuitry 310 transfers 312 the audio of the query to local device transceiver circuitry 314. Local device transceiver circuitry 314 comprises a network connection over which data can be transmitted to and received from remote devices, such as an ethernet connection, WiFi connection, or connection employing any other suitable networking protocol. Audio of the query is transmitted 316 by local device transceiver circuitry 314 over communication network 318 (e.g., LAN, WAN, the Internet, etc.). Communication network 318 relays 320 the audio of the query to server 322, where server control circuitry 324, using server transceiver circuitry 326, receives the audio of the query. Server transceiver circuitry 326 may be similar to local device transceiver circuitry 314. Server transceiver circuitry 326 transfers 328 the audio of the query to server processing circuitry 330. Server processing circuitry 330 comprises speech-to-text circuitry and other language processing circuitry to enable transcription of the audio of the query to corresponding text. Server processing circuitry 330 may implement a more complex version of the local speech-to-text model. Server processing circuitry 330 transfers 332 the transcription of the query to server transceiver circuitry 326, where it is transmitted back 334 over communication network 318, which relays 336 the transcript to local device 300, where it is received by local device transceiver circuitry 314. Local device transceiver circuitry 314 transfers 338 the transcription to storage 342 where it is added to the data structure 110. Storage 342 may be any device for storing electronic data, such as random-access memory, read-only memory, hard drives, solid state devices, quantum storage devices, or any other suitable fixed or removable storage devices, and/or any combination of the same.

Server processing circuitry 330 may, in generating a transcription of the query, identify a plurality of phonemes corresponding to the individual sounds of the query. For example, if the query comprises the word "start," server processing circuitry 330 may identify five phonemes, "S," "T," "A," "R," and "T" representing the five distinct sounds of the word "start." Server processing circuitry 330 may also identify a plurality of graphemes, each representing the sound of each phoneme. Continuing with the above example, server processing circuitry 330 may identifier "S," "T," "AA," "R," and "T" as the five graphemes representing the sounds made by each of the corresponding phonemes. In addition to transmitting the transcription of the query, server processing circuitry 330 may also transmits the phonemes and graphemes to local device 300 for storage in association with the transcription and the audio clip of the query in the data structure 110. This and other metadata describing the query, including sound distributions, rhythm, cadence, accent, and other audio characteristics, are transferred 340 to local device processing circuitry 310. Local device processing circuitry 310 uses the metadata to further train the local speech-to-text model to recognize future instances of the query.

Both sever processing circuitry 330 and local device processing circuitry 310, in implementing a speech-to-text model, may do so using a convolutional neural network or a recurrent neural network. To identify individual phonemes and graphemes, the speech-to-text models may use a conditional random field model or a Hidden Markov model.

To interpret a voice query, local device processing circuitry 310 processes the voice query received 306 by local device 300 via input circuitry 304 using a local speech-to-text model to generate a transcription of the voice query. Local device processing circuitry 310 then compares the transcription to data structure 110 stored in, for example, storage 342. Local device processing circuitry 310 may transmit 354 the voice query, audio representing the voice query, or a structured query (e.g., an SQL "SELECT" command) to storage 342. In response, storage 342 returns 356 the data structure 110 or a subset of entries of data structure 110 for processing by local device processing circuitry 310, or a single transcription corresponding to the voice query. For example, in addition to storing data, storage 342 may comprise a processor or memory management interface configured to analyze incoming requests for data, and to select and return matching data entries from data structure 110. If data structure 110 or a subset of entries from data structure 110 table are returned, local device processing circuitry 310 performs a comparison between the audio of the voice query and audio clips in data structure 110. Local device processing circuitry 310 generates a transcription of the voice query using a local speech-to-text model and compares the transcription with entries in the data structure 110 to determine if the voice query matches an entry of data structure 110. If a match is found, and the match belongs to a group of entries associated with particular actions that the local device 300 can perform, local device 300 performs the particular action associated with the matching entry.

FIG. 4 shows an exemplary data structure 400 supporting a local speech-to-text model, in accordance with some embodiments of the disclosure. Data structure 400 includes several fields relating to each voice query. Data structure 400 includes sound file field 402, in which an audio clip of the voice query is stored. Phonemes field 404 contains a list of phonemes corresponding to the various sounds of the voice query, and graphemes field 406 contains a list of graphemes corresponding to the list of phonemes in phoneme field 404. Sequence field 408 contains an ordered construct of the graphemes stored in grapheme field 406. Finally, transcription field 410 contains a text transcription of the voice query. For example, entry 412 in data structure 400 relates to a first voice query comprising the word "start." Sound file 414, representing audio of the voice query, is stored in sound file field 402 of entry 412. Phonemes 416a-416e ("S sound," "T sound," "A sound," "R sound," "T sound"), corresponding to the individual sounds of the word "start" are stored in phoneme field 404 of entry 412, and corresponding graphemes 418a-418e ("S," "T," "AA," "R," "T") are stored in graphemes field 406 of entry 412. The ordered construct "STAART" of graphemes 418a-418e is stored in sequence field 408 of entry 412, and the transcript "START" of the voice query is stored in transcription field 410 of entry 412. The data to populate entry 412 may be received from server 322 in response to transmission by local device 300 of the voice query for transcription. The word "start" may be recognized by local device 300 as an action that can be performed by local device 300. Thus, upon receiving the transcription, in addition to storing entry 412 in data structure 400, local device 300 may perform the action associated with the word "start" (e.g., begin playback of a content item from the beginning).

As a second example, a voice query "launch Netflix" is received at local device 300. Local device 300 may compare audio of the voice query with audio clips stored in the sound file field 402 of various entries in data structure 400 and may identify entry 424 as a matching entry. Local device 300, using local device processing circuitry 310, may compare audio characteristics of the voice query with audio characteristics of sound file 426 to identify a match. Alternatively or additionally, local device processing circuitry 310 may identify phonemes and corresponding graphemes of the sounds of the voice query using a local speech-to-text model employing a convolutional neural network, a recurrent neural network, a conditional random field model, or a Hidden Markov model. Local device processing circuitry 310 may then compare the identified phonemes with phonemes 428a-428m, stored in phonemes field 404 of entry 424, or compare the identified graphemes with graphemes 430a-430k stored in graphemes field 406 of entry 424. To confirm a match, local device processing circuitry 310 may further compare the identified graphemes to sequence 430 to determine if the identified graphemes appear in the same order as those stored in entry 424. If the voice query is determined to be a match with entry 424, transcription 434 is retrieved, and local device 300 responds accordingly. In this example, the word "launch" may be recognized as an action to be performed, namely to run an application, and the word "Netflix" may be contextually recognized as the application to be launched.

In some embodiments, the voice query is divided into individual words for processing. For example, a voice query may be a command to "start Game of Thrones." Entry 412 of data structure 400 is associated with the word "start," and local device 300 may recognize it as a command to begin playback of content. However, no entry in data structure 400 is associated with any of the words "game," "of," or "thrones." Alternatively or additionally, the local speech-to-text model may not recognize any of these words. Local device 300 may request transcription of each word individually from server 322. Alternatively, because the words are contiguous, local device 300 may request transcription of the entire phrase. Local device 300 may determine to do so based on recognizing "start" as a command to begin playback of a content item, and may infer from such recognition that the words following the "start" command identify a particular content item.

Data structure 400 may include static and dynamic entries. Static entries may be associated with known commands corresponding to actions capable of being performed by local device 300. The local speech-to-text model may be pre-trained to recognize words corresponding to static entries. Dynamic entries may be associated with names of content item, actors, applications, and other items generally identified through the use of proper nouns. The local speech-to-text model may not be trained to recognize such words. Local device processing circuitry 310 may further train the local speech-to-text model using transcriptions of such words received from server 322. Alternatively or additionally, content catalog 346 is updated by a service provider, the service provider may automatically push to local device 300, along with the updated content catalog, updated dynamic entries to be stored in data structure 400. The service provider may also push to local device 300 training data to supplement the local speech-to-text model, thereby enabling it to recognize words corresponding to content items in the content catalog.

Figure 5:
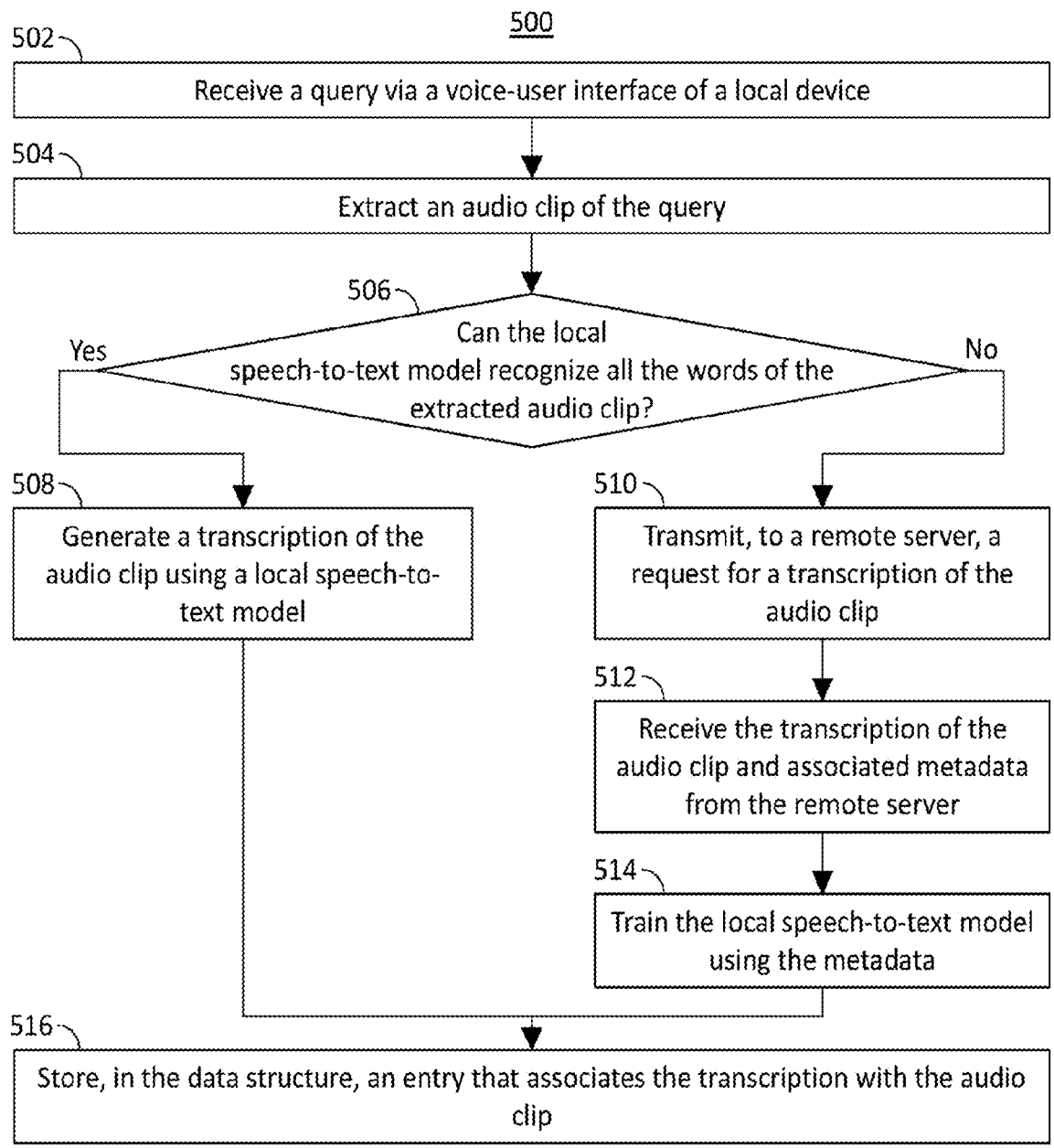
FIG. 5 is a flowchart representing a process for building a data structure to support a local speech-to-text model, in accordance with some embodiments of the disclosure.

FIG. 5 is a flowchart representing an illustrative process 500 for building a data structure to support a local speech-to-text model, in accordance with some embodiments of the disclosure. Process 500 may be implemented on control circuitry 308, control circuitry 324, or both. In addition, one or more actions of process 500 may be incorporated into or combined with one or more actions of any other process or embodiment described herein.

At 502, local device 300 receives, using input circuitry 304, a voice query from a voice-user interface of local device 300. The voice query may be received as an analog signal from a microphone, or a digital audio signal. The digital audio signal may be raw audio data, or may be compressed, filtered, or encoded using any suitable audio compression or encoding format. At 504, local device 300, using local device processing circuitry 310 of local device control circuitry 308, extracts an audio clip of the query. For example, the audio received from the voice-user interface may include portions that are silent or contain non-verbal sounds. Local device processing circuitry 310 may extract an audio clip from the voice query that contains only the words spoken by the user.

At 506, local device control circuitry 308 determines whether the local speech-to-text model can recognize all the words of the extracted audio clip. For example, local device control circuitry 308, using local device processing circuitry 310, may compare the audio clip with audio clips stored in the data structure to determine whether the query has been previously received and/or processed. Alternatively or additionally, local device control circuitry 308 may process the audio clip to identify phonemes and/or graphemes corresponding to sounds in the extracted audio clip and compare them to phonemes and graphemes stored in association with each entry in the data structure. If a match is found, then the local speech-to-text model is capable of recognizing all the words in the extracted audio clip and, at 510, local device control circuitry 308 generates a transcription of the audio clip using the local speech-to-text model. If no match is found, local device processing circuitry 310 may isolate individual words from the audio clip based on timing, rhythm, and cadence. Local device processing circuitry 310 may then compare audio of each word with the audio clips stored in the data structure to identify which words, if any, the local speech-to-text model can recognize and which it cannot recognize. At 510, local device control circuitry 308, using transceiver circuitry 314 transmits, to remote server 322, a request for a transcription of the audio clip or any portion or portions thereof that the local speech-to-text model cannot recognize. Server 322, using server processing circuitry 330 of server control circuitry 324, performs speech recognition processing to generate a transcript of the extracted audio clip. Server processing circuitry 330 may use a more complex version of the local speech-to-text model. At 512, local device 300 receives the transcription from the remote server, along with associated metadata describing the audio for which the transcription was requested. At 514, local device control circuitry 308 uses the metadata describing the audio to further train the local speech-to-text model to recognize the words of the query that were not recognizable. At 516, local device control circuitry 308 stores either transcription generated by the local speech-to-text model, the transcription received from the remote server, or a combination thereof in an entry in the data structure that associates the transcription with the audio clip. For example, local device control circuitry 308 generates a new entry in the table and stores the extracted audio clip in the table along with the transcription. In addition, local device control circuitry 308 may store phonemes and graphemes, and the sequence in which they occur in the audio clip, in the table as well.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
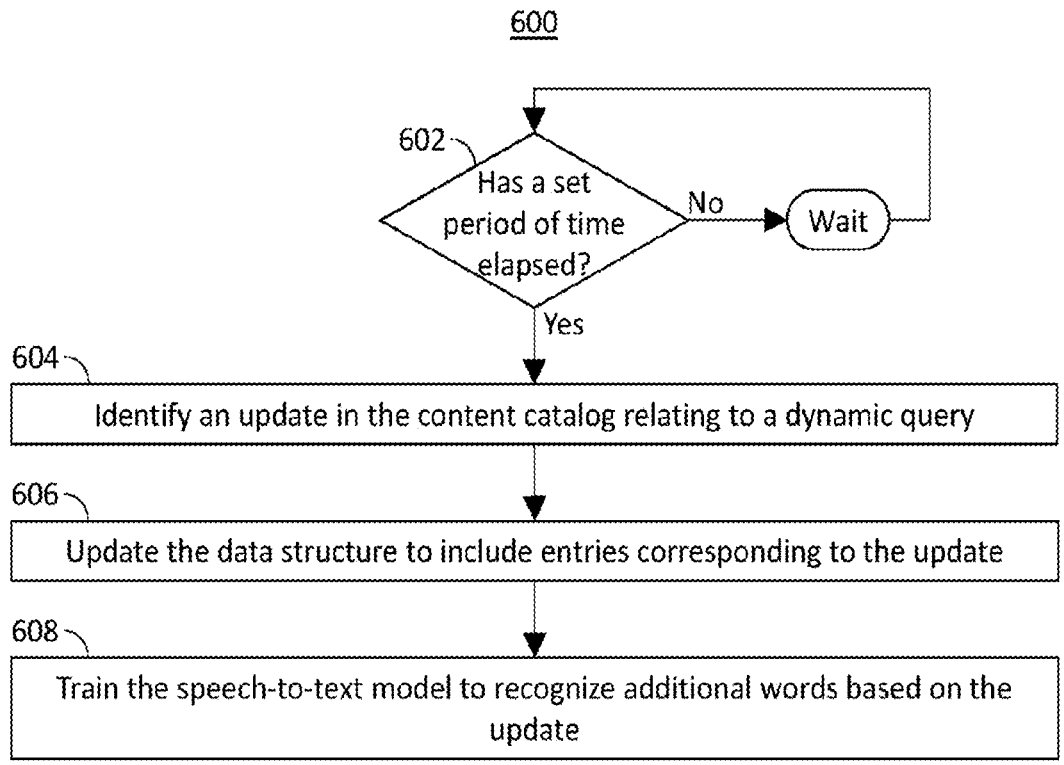
FIG. 6 is a flowchart representing a process for updating entries in a data structure supporting a local speech-to-text model and further training the model, in accordance with some embodiments of the disclosure.

FIG. 6 is a flowchart representing an illustrative process 600 for updating entries in a data structure supporting a local speech-to-text model and further training the model, in accordance with some embodiments of the disclosure. Process 600 may be implemented on control circuitry 308, control circuitry 324, or both. In addition, one or more actions of process 600 may be incorporated into or combined with one or more actions of any other process or embodiment described herein.

At 602, local device control circuitry 308 determines whether a set period of time has elapsed. A content catalog such as content catalog 348 may be updated weekly. For example, the content catalog is updated every Sunday at 12:00 AM. On a particular Sunday, content catalog 348 is updated to include the TV series "Game of Thrones," which was not previously included in content catalog 348. Thus, local device 300 may set a one-week timer. Local device control circuitry 308 may check the amount of time remaining on the timer. Alternatively, local device control circuitry 308 may store a variable corresponding to a particular date and time representing the end of the set period of time. Local device control circuitry 308 may compare the current date and time with that of the stored variable to determine if the end of the set period of time as yet passed. If the set period of time has not yet elapsed ("No" at 602), then local control circuitry 308 waits before returning to step 602.

If the set period of time has elapsed ("Yes" at 602), then, at 604, local device control circuitry 308 identifies an update in the content catalog relating to the dynamic query. For example, local device 300 transmits a request to server 322 to access content catalog 348 and retrieve records added or modified within the set period of time prior to the current time. Local device 300 may also retrieve training data or metadata describing audio characteristics of the new or modified records. At 606, local device control circuitry 308 updates the data structure to include entries for the new records and modifies existing entries corresponding to the modified records to reflect the modifications. For example, local device control circuitry 308 may receive records from content catalog 348 relating to the voice query. Alternatively, server control circuitry 324 may process the records retrieved from content catalog 348 and compare them to audio of the voice query to identify a matching record. Server 322 may then transmit the corresponding transcription to local device 300 for storage in the data structure. At 608, local device control circuitry 308 uses the training data or metadata, such as phonemes and graphemes, and the sequence in which they occur in each record, to further train the local speech-to-text model to recognize additional words based on the update. The metadata or training data may be stored in the data structure as well.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
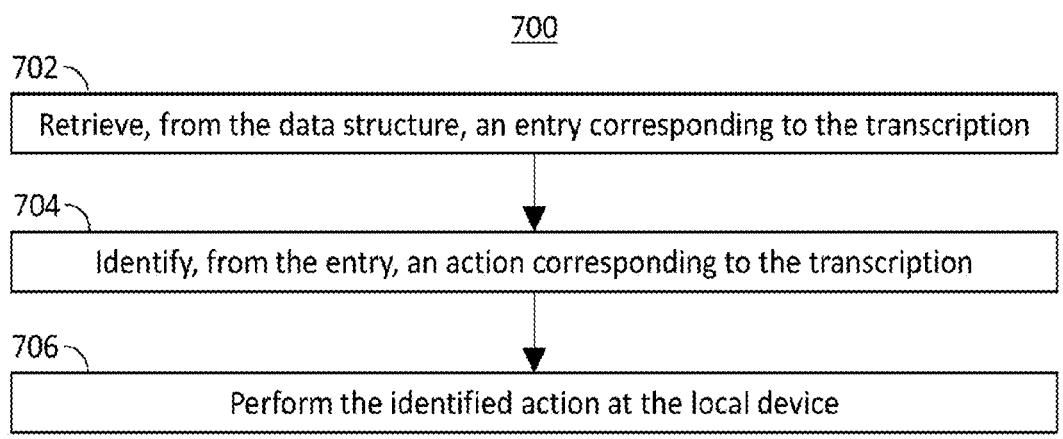
FIG. 7 is a flowchart representing a process for performing an action corresponding to an interpreted voice query, in accordance with some embodiments of the disclosure.

FIG. 7 is a flowchart representing an illustrative process 700 for performing an action corresponding to an interpreted voice query, in accordance with some embodiments of the disclosure. Process 700 may be implemented on control circuitry 308, control circuitry 324, or both. In addition, one or more actions of process 700 may be incorporated into or combined with one or more actions of any other process or embodiment described herein.

At 702, local device control circuitry 308 retrieves an entry from the data structure corresponding to the transcription of the extracted audio clip from the. At 704, local device control circuitry 308 identifies an action corresponding to the transcription. For example, words corresponding to actions may, in their entries in the data structure, indicate that a corresponding action can be performed by local device 300. Alternatively, actions may have separately identifiable entries in the data structure or a separate data structure of known actions and corresponding voice commands. Local device 300 may store, in association with words corresponding to actions, a sequence of commands, a script, or an executable instruction for performing the corresponding action. If an action is identified, then, at 706, local device 300 performs the action.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
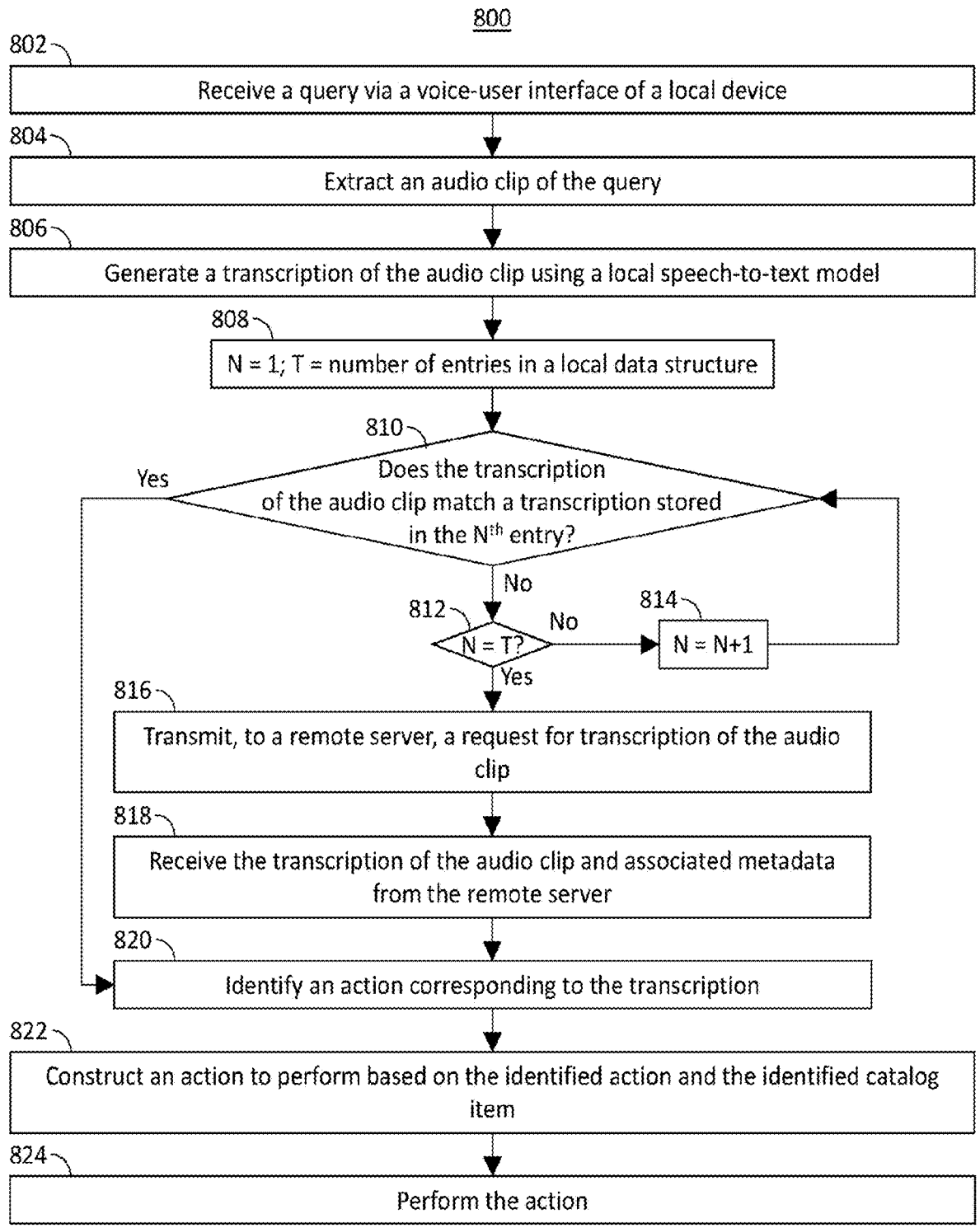
FIG. 8 is a flowchart representing a process for interpreting a voice query, in accordance with some embodiments of the disclosure.

FIG. 8 is a flowchart representing an illustrative process 800 for interpreting a voice query, in accordance with some embodiments of the disclosure. Process 800 may be implemented on control circuitry 308, control circuitry 324, or both. In addition, one or more actions of process 800 may be incorporated into or combined with one or more actions of any other process or embodiment described herein.

At 802, local device control circuitry 308 receives a query via a voice-user interface of local device 300 and, at 804, extracts an audio clip of the query as described above in connection with FIG. 5. The query may contain both static and dynamic portions. A static query is a command that can be interpreted without data describing a content item, such as "go to channel 10" or "volume up" or other similar tuning, volume, and power on/off commands. A dynamic query, on the other hand, may include a title, actor, or other content-specific words. These queries are considered dynamic because the catalog of available content changes over time. Local device control circuitry 308 may determine which type of query was received by determining whether the query is associated with an action capable of being performed by the local device 300. For example, tuning commands, volume commands, and power commands are not subject to change over time and are associated with actions capable of being performed by the local device 300. Such commands are thus considered static queries.

At 806, local device control circuitry 308 generates a transcription of the audio clip using the local speech-to-text model. The transcription may be further processed using natural language processing to identify portions of the voice query. For example, local device processing circuitry 310 may identify a set of individual words or grammatically separate phrases. For example, by processing the query "go to channel 10," local device control circuitry 308 may identify the words "go," "to," "channel," and "ten" as spoken by the user. Alternatively or additionally, local device control circuitry 308 may identify grammatical structures, such as verbs and nouns, that can be used to interpret the intent of the query. In processing the query "go to channel 10," local device control circuitry 308 may identify "go to" as a verb or command, and "channel 10" as a noun to which the command "go to" refers. As another example, by processing the query "play Game of Thrones," local device control circuitry 308 may identify the words "play," "game," "of," and "thrones," and may identify the word "play" as a command and the phrase "Game of Thrones" as a noun to which the command refers, if that content item currently has an entry in the local speech-to-text table. If not, local device control circuitry 308 may generally identify the phrase "Game of Thrones" as an unknown phrase or may determine from context, based on the "play" command, that the phrase refers to some content item. This identification of portions of the query may facilitate later identification of an action to perform in response to the query.

At 808, local device control circuitry 308 initializes a counter variable N, setting its value to one, and a variable T representing the number of entries in the data structure. At 810, local device control circuitry 308 determines whether the transcription of the audio clip matches a transcription stored in the $N^{th}$ entry. For example, local device control circuitry 308 may compare the entire transcription to that of each entry in the data structure. Alternatively, local device control circuitry 308 may separately compare each portion of the transcription to transcriptions stored in the data structure. For example, the command "go to" or "play" is a static command that local device 300 can execute. If the transcription of the audio clip does not match the transcription stored in the $N^{th}$ entry ("No" at 810), then, at 812, local device control circuitry 308 determines whether N is equal to T, meaning that the transcription has been compared to all transcriptions stored in the data structure. If N is not equal to T ("No" at 812), then, at 814, local device control circuitry 308 increments the value of N by one, and processing returns to step 810. If N is equal to T ("Yes" at 812), then, at 816, local device control circuitry 308 transmits a request for transcription of the audio clip to remote server 322. At 818, in response to the request, local device control circuitry 308 receives the transcription of the audio clip and associated metadata from remote server 322.

Once a transcription of the audio clip has been retrieved ("Yes" at 810 or following step 818), local device control circuitry 308 identifies an action corresponding to the transcription. This may be accomplished using methods described above in connection with in connection with FIG. 7.

At 822, local device control circuitry 308 constructs an action to perform based on the identified action and the identified catalog item. For example, by processing the query "play Game of Thrones," local device control circuitry 308 identifies a tuning action based on the word "play" and identifies the catalog item to play based on the phrase "Game of Thrones" and constructs a tuning action to access a linear channel, video-on-demand service, or Internet streaming service (e.g., Netflix, Hulu, Amazon Prime) on which "Game of Thrones" is available. Then, at 824, local device control circuitry 308 performs the action.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This specification discloses embodiments which include, but are not limited to, the following:

1. A method for building a data structure to support a local speech-to-text model, the method comprising:
   receiving a query via a voice-user interface of a local device;
   determining whether the local speech-to-text model can recognize the query;
   in response to determining that the local speech-to-text model can recognize the query, generating a transcription of the query using the local speech-to-text model;
   in response to determining that the local speech-to-text model cannot recognize the query:
     transmitting, to a remote server over a communication network, a request for a speech-to-text transcription of the query; and
     receiving, in response to the request, the transcription of the query and metadata corresponding to the query from the remote server over the communication network; and
   storing, in a data structure at the local device, an entry that associates an audio clip of the query with the corresponding transcription for use in recognition of a query subsequently received via the voice-user interface of the local device.

2. The method of item 1, further comprising training the local speech-to-text model to recognize subsequent instances of the query based on the metadata corresponding to the query.

3. The method of item 1, further comprising storing a plurality of entries in the data structure, each entry corresponding to a respective transcription, wherein each entry belongs to a static set of entries or a dynamic set of entries, the static set of entries corresponding to functions executable by the local device and the dynamic set of entries corresponding to content available from a content catalog.

4. The method of item 3, further comprising:
   determining that a period of time has elapsed;
   identifying, at the server, an update corresponding to the content catalog; and
   in response to identifying the update:
     updating the data structure to include entries corresponding to the update; and
     training the speech-to-text model to recognize additional words based on the update.

5. The method of item 3, wherein each entry of the static set of entries corresponds to at least one of playing, pausing, skipping, exiting, tuning, fast-forwarding, rewinding, recording, increasing volume, decreasing volume, powering on, and powering off.

6. The method of item 3, wherein the dynamic portion is a title, name, or identifier.

7. The method of item 1, wherein the speech-to-text model is smaller than a second speech-to-text model used by the remote server.

8. The method of item 1, wherein the entry comprises the audio clip mapped to a phoneme, wherein the phoneme is mapped to a set of graphemes, wherein the set of graphemes is mapped to a sequence of graphemes, and wherein the sequence of graphemes is mapped to the transcription.

9. The method of item 1, further comprising:
   identifying, in the data structure, an action corresponding to the transcription, wherein the action is performable by the local device; and
   performing the action at the local device.

10. The method of item 1, further comprising associating a plurality of audio clips with each entry in the data structure, wherein each audio clip corresponds to a query corresponding to the entry, and wherein the query was received via the voice-user interface of the local device.

11. A system for building a data structure to support a local speech-to-text model, the system comprising:
   memory;
   a voice-user interface; and
   control circuitry configured to:
      receive a query via the voice-user interface;
      determine whether the local speech-to-text model can recognize the query;
      in response to determining that the local speech-to-text model can recognize the query, generating a transcription of the query using the local speech-to-text model;
      in response to determining that the local speech-to-text model cannot recognize the query:
         transmit, to a remote server over a communication network, a request for a speech-to-text transcription of the query; and
         receive, in response to the request, the transcription of the query and metadata corresponding to the query from the remote server over the communication network; and
      store, in a data structure in the memory, an entry that associates an audio clip of the query with the corresponding transcription for use in recognition of a query subsequently received via the voice-user interface of the local device.

12. The system of item 11, wherein the control circuitry is further configured to train the speech-to-text model to recognize subsequent instances of the query based on the metadata corresponding to the query.

13. The system of item 11, wherein the control circuitry is further configured to store a plurality of entries in the data structure, each entry corresponding to a respective transcription, wherein each entry belongs to a static set of entries or a dynamic set of entries, the static set of entries corresponding to functions executable by the local device and the dynamic set of entries corresponding to content available from a content catalog.

14. The system of item 13, wherein the control circuitry is further configured to:
   determine that a period of time has elapsed;
   identify, at the server, an update corresponding to the content catalog; and
   in response to identifying the update:
      update the data structure to include entries corresponding to the update; and
      train the speech-to-text model to recognize additional words based on the update.

15. The system of item 13, wherein each entry of the static set of entries corresponds to at least one of playing, pausing, skipping, exiting, tuning, fast-forwarding, rewinding, recording, increasing volume, decreasing volume, powering on, and powering off.

16. The system of item 13, wherein the dynamic portion is a title, name, or identifier.

17. The system of item 11, wherein the speech-to-text model is smaller than a second speech-to-text model used by the remote server.

18. The system of item 11, wherein the entry comprises the audio clip mapped to a phoneme, wherein the phoneme is mapped to a set of graphemes, wherein the set of graphemes is mapped to a sequence of graphemes, and wherein the sequence of graphemes is mapped to the transcription.

19. The system of item 11, wherein the control circuitry is further configured to:
   identify, in the data structure, an action corresponding to the transcription, wherein the action is performable by the local device; and
   perform the action at the local device.

20. The system of item 11, wherein the control circuitry is further configured to associate a plurality of audio clips with each entry in the data structure, wherein each audio clip corresponds to a query corresponding to the entry, and wherein the query was received via the voice-user interface of the local device.

21. A system for building a data structure to support a local speech-to-text model, the system comprising:
   means for receiving a query via a voice-user interface of a local device;
   means for determining whether the local speech-to-text model can recognize the query;
   means for, in response to determining that the local speech-to-text model can recognize the query, generating a transcription of the query using the local speech-to-text model;
   means for, in response to determining that the local speech-to-text model cannot recognize the query:
      transmitting, to a remote server over a communication network, a request for a speech-to-text transcription of the query; and
      receiving, in response to the request, the transcription of the query and metadata corresponding to the query from the remote server over the communication network; and
   means for storing, in a data structure at the local device, an entry that associates an audio clip of the query with the corresponding transcription for use in recognition of a query subsequently received via the voice-user interface of the local device.

22. The system of item 21, further comprising means for training the speech-to-text model to recognize subsequent instances of the query based on the metadata corresponding to the query.

23. The system of item 21, further comprising means for storing a plurality of entries in the data structure, each entry corresponding to a respective transcription, wherein each entry belongs to a static set of entries or a dynamic set of entries, the static set of entries corresponding to functions executable by the local device and the dynamic set of entries corresponding to content available from a content catalog.

24. The system of item 23, further comprising:
- means for determining that a period of time has elapsed;
- means for identifying, at the server, an update corresponding to the content catalog; and
- means for, in response to identifying the update:
  - updating the data structure to include entries corresponding to the update; and
  - train the speech-to-text model to recognize additional words based on the update.

25. The system of item 23, wherein each entry of the static set of entries corresponds to at least one of playing, pausing, skipping, exiting, tuning, fast-forwarding, rewinding, recording, increasing volume, decreasing volume, powering on, and powering off.

26. The system of item 23, wherein the dynamic portion is a title, name, or identifier.

27. The system of item 21, wherein the speech-to-text model is smaller than a second speech-to-text model used by the remote server.

28. The system of item 21, wherein the entry comprises the audio clip mapped to a phoneme, wherein the phoneme is mapped to a set of graphemes, wherein the set of graphemes is mapped to a sequence of graphemes, and wherein the sequence of graphemes is mapped to the transcription.

29. The system of item 21, further comprising:
- means for identifying, in the data structure, an action corresponding to the transcription, wherein the action is performable by the local device; and
- means for performing the action at the local device.

30. The system of item 21, further comprising means for associating a plurality of audio clips with each entry in the data structure, wherein each audio clip corresponds to a query corresponding to the entry, and wherein the query was received via the voice-user interface of the local device.

31. A non-transitory computer-readable medium having non-transitory computer-readable instructions encoded thereon for building a data a structure to support a local speech-to-text model that, when executed by control circuitry, cause the control circuitry to:
- receive a query via a voice-user interface of a local device;
- determine whether the local speech-to-text model can recognize the query;
- in response to determining that the local speech-to-text model can recognize the query, generate a transcription of the query using the local speech-to-text model;
- in response to determining that the local speech-to-text model cannot recognize the query:
  - transmit, to a remote server over a communication network, a request for a speech-to-text transcription of the query; and
  - receive, in response to the request, the transcription of the query and metadata corresponding to the query from the remote server over the communication network; and
- store, in a data structure at the local device, an entry that associates an audio clip of the query with the corresponding transcription for use in recognition of a query subsequently received via the voice-user interface of the local device.

32. The non-transitory computer-readable medium of item 31, wherein execution of the instructions further causes the control circuitry to train the speech-to-text model to recognize subsequent instances of the query based on the metadata corresponding to the query.

33. The non-transitory computer-readable medium of item 31, wherein execution of the instructions further causes the control circuitry to store a plurality of entries in the data structure, each entry corresponding to a respective transcription, wherein each entry belongs to a static set of entries or a dynamic set of entries, the static set of entries corresponding to functions executable by the local device and the dynamic set of entries corresponding to content available from a content catalog.

34. The non-transitory computer-readable medium of item 33, wherein execution of the instructions further causes the control circuitry to:
- determine that a period of time has elapsed;
- identify, at the server, an update corresponding to the content catalog; and
- in response to identifying the update:
  - update the data structure to include entries corresponding to the update; and
  - train the speech-to-text model to recognize additional words based on the update.

35. The non-transitory computer-readable medium of item 33, wherein each entry of the static set of entries corresponds to at least one of playing, pausing, skipping, exiting, tuning, fast-forwarding, rewinding, recording, increasing volume, decreasing volume, powering on, and powering off.

36. The non-transitory computer-readable medium of item 33, wherein the dynamic portion is a title, name, or identifier.

37. The non-transitory computer-readable medium of item 31, wherein the speech-to-text model is smaller than a second speech-to-text model used by the remote server.

38. The non-transitory computer-readable medium of item 31, wherein the entry comprises the audio clip mapped to a phoneme, wherein the phoneme is mapped to a set of graphemes, wherein the set of graphemes is mapped to a sequence of graphemes, and wherein the sequence of graphemes is mapped to the transcription.

39. The non-transitory computer-readable medium of item 31, wherein execution of the instructions further causes the control circuitry to:
- identify, in the data structure, an action corresponding to the transcription, wherein the action is performable by the local device; and
- perform the action at the local device.

40. The non-transitory computer-readable medium of item 31, wherein execution of the instructions further causes the control circuitry to associate a plurality of audio clips with each entry in the data structure, wherein each audio clip corresponds to a query corresponding to the entry, and wherein the query was received via the voice-user interface of the local device.

41. A method for building a data structure to support a local speech-to-text model, the method comprising:
- receiving a query via a voice-user interface of a local device;
- identifying a plurality of words in the query;
- determining whether the local speech-to-text model can recognize each word of the plurality of words in the query;
- in response to determining that the local speech-to-text model can recognize each word in the plurality of words in the query, generating a transcription of the query using the local speech-to-text model;
- in response to determining that the local speech-to-text model cannot recognize each word in the plurality of words in the query:

transmitting, to a remote server over a communication network, a request for a speech-to-text transcription of at least one word of the plurality of words in the query; and receiving, in response to the request, the transcription of the at least one word of the plurality of words in the query and metadata corresponding to the at least one word of the plurality of words in the query from the remote server over the communication network; and storing, in a data structure at the local device, a plurality of entries, each entry associating an audio clip of a respective word of the plurality of words in the query with the corresponding transcription for use in recognition of a query subsequently received via the voice-user interface of the local device.

42. The method of item 41, further comprising training the speech-to-text model to recognize subsequent instances of the query based on the metadata corresponding to the query.

43. The method of any of items 41-42, further comprising storing a plurality of entries in the data structure, each entry corresponding to a respective transcription, wherein each entry belongs to a static set of entries or a dynamic set of entries, the static set of entries corresponding to functions executable by the local device and the dynamic set of entries corresponding to content available from a content catalog.

44. The method of item 43, further comprising:
determining that a period of time has elapsed;
identifying, at the server, an update corresponding to the content catalog; and
in response to identifying the update:
updating the data structure to include entries corresponding to the update; and
training the speech-to-text model to recognize additional words based on the update.

45. The method of any of items 43-44, wherein each entry of the static set of entries corresponds to at least one of playing, pausing, skipping, exiting, tuning, fast-forwarding, rewinding, recording, increasing volume, decreasing volume, powering on, and powering off.

46. The method of any of items 43-45, wherein the dynamic portion is a title, name, or identifier.

47. The method of any of items 42-46, wherein the speech-to-text model smaller than a second speech-to-text model used by the remote server.

48. The method of any of items 41-47, wherein the entry comprises the audio clip mapped to a phoneme, wherein the phoneme is mapped to a set of graphemes, wherein the set of graphemes is mapped to a sequence of graphemes, and wherein the sequence of graphemes is mapped to the transcription.

49. The method of any of items 41-48, further comprising:
identifying, in the data structure, an action corresponding to the transcription, wherein the action is performable by the local device; and
performing the action at the local device.

50. The method of any of items 41-49, further comprising associating a plurality of audio clips with each entry in the data structure, wherein each audio clip corresponds to a query corresponding to the entry, and wherein the query was received via the voice-user interface of the local device.

51. A method for interpreting a query received at a local device, the method comprising:
receiving a query via a voice-user interface at a local device;
generating a transcription of the query using a local speech-to-text model;
comparing the transcription to a data structure stored at the local device, wherein the data structure comprises a plurality of entries, and wherein each entry comprises an audio clip of a previously received query and a corresponding transcription;
determining whether the data structure comprises an entry that matches the query; and
in response to determining that the data structure comprises an entry that matches the query, identifying an action associated with the matching entry.

52. The method of item 51, further comprising performing, at the local device, the identified action.

53. The method of item 51, wherein the data structure comprises a plurality of entries, and wherein each entry comprises an audio clip mapped to a phoneme, wherein the phoneme is mapped to a set of graphemes, wherein the set of graphemes is mapped to a sequence of graphemes, and wherein the sequence of graphemes is mapped to a transcription.

54. The method of item 51, wherein comparing the query to the data structure stored at the local device comprises comparing the query to an audio clip associated with each entry in the data structure.

55. The method of item 51, wherein comparing the query to the data structure stored at the local device comprises comparing the query to a plurality of graphemes associated with each entry in the data structure.

56. The method of item 51, further comprising storing an audio clip of the query as a second clip associated with the matching query.

57. The method of item 51, wherein the query corresponds to at least one of playing, pausing, skipping, exiting, tuning, fast-forwarding, rewinding, recording, increasing volume, decreasing volume, powering on, and powering off.

58. The method of item 51, wherein the query corresponds to at least one of a title, a name, or an identifier.

59. The method of item 51, further comprising:
determining that the local speech-to-text model cannot recognize the query;
transmitting, to a remote server over a communication network, a request for a speech-to-text transcription of the query;
receiving the transcription of the query from the remote server over the communication network; and
storing, in the data structure at the local device, an entry that associates an audio clip of the query with the corresponding transcription for use in recognition of a query subsequently received via the voice-user interface of the local device.

60. The method of item 51, wherein the local device receives the transcription of the audio clip of the previously received query from a remote server over a communication network prior to receiving the query via the voice-user interface at the local device.

61. A system for interpreting a query received at a local device, the system comprising:
memory;
a voice-user interface; and
control circuitry configured to:
receive a query via the voice-user interface;
generate a transcription of the query using a local speech-to-text model;
compare the transcription to a data structure stored in the memory, wherein the data structure comprises a plurality of entries, and wherein each entry comprises an audio clip of a previously received query and a corresponding transcription;

determining whether the data structure comprises an entry that matches the query; and in response to determining that the data structure comprises an entry that matches the query, identifying an action associated with the matching entry.

62. The system of item 61, wherein the control circuitry is further configured to perform the identified action.

63. The system of item 61, wherein the data structure comprises a plurality of entries, and wherein each entry comprises an audio clip mapped to a phoneme, wherein the phoneme is mapped to a set of graphemes, wherein the set of graphemes is mapped to a sequence of graphemes, and wherein the sequence of graphemes is mapped to a transcription.

64. The system of item 61, wherein the control circuitry configured to compare the query to the data structure stored in the memory is further configured to compare the query to an audio clip associated with each entry in the data structure.

65. The system of item 61, wherein the control circuitry configured to compare the query to the data structure stored in the memory is further configured to compare the query to a plurality of graphemes associated with each entry in the data structure.

66. The system of item 61, wherein the control circuitry is further configured to store an audio clip of the query as a second clip associated with the matching query.

67. The system of item 61, wherein the query corresponds to at least one of playing, pausing, skipping, exiting, tuning, fast-forwarding, rewinding, recording, increasing volume, decreasing volume, powering on, and powering off.

68. The system of item 61, wherein the query corresponds to at least one of a title, a name, or an identifier.

69. The system of item 61, wherein the control circuitry is further configured to:
  determine that the local speech-to-text model cannot recognize the query;
  transmit, to a remote server over a communication network, a request for a speech-to-text transcription of the query;
  receive the transcription of the query from the remote server over the communication network; and
  store, in the data structure, an entry that associates an audio clip of the query with the corresponding transcription for use in recognition of a query subsequently received via the voice-user interface of the local device.

70. The system of item 61, wherein the local device receives the transcription of the audio clip of the previously received query from a remote server over a communication network prior to receiving the query via the voice-user interface at the local device.

71. A system for interpreting a query received at a local device, the system comprising:
  means for receiving a query via a voice-user interface at a local device;
  means for generating a transcription of the query using a local speech-to-text model;
  means for comparing the transcription to a data structure stored at the local device, wherein the data structure comprises a plurality of entries, and wherein each entry comprises an audio clip of a previously received query and a corresponding transcription;
  means for determining whether the data structure comprises an entry that matches the query; and
  means for, in response to determining that the data structure comprises an entry that matches the query, identifying an action associated with the matching entry.

72. The system of item 71, further comprising means for performing the identified action.

73. The system of item 71, wherein the data structure comprises a plurality of entries, and wherein each entry comprises an audio clip mapped to a phoneme, wherein the phoneme is mapped to a set of graphemes, wherein the set of graphemes is mapped to a sequence of graphemes, and wherein the sequence of graphemes is mapped to a transcription.

74. The system of item 71, wherein the means for comparing the query to the data structure stored at the local device comprises means for comparing the query to an audio clip associated with each entry in the data structure.

75. The system of item 71, wherein the means for comparing the query to the data structure stored at the local device comprises means for comparing the query to a plurality of graphemes associated with each entry in the data structure.

76. The system of item 71, further comprising means for storing an audio clip of the query as a second clip associated with the matching query.

77. The system of item 71, wherein the query corresponds to at least one of playing, pausing, skipping, exiting, tuning, fast-forwarding, rewinding, recording, increasing volume, decreasing volume, powering on, and powering off.

78. The system of item 71, wherein the query corresponds to at least one of a title, a name, or an identifier.

79. The system of item 71, further comprising:
  means for determining that the local speech-to-text model cannot recognize the query;
  means for transmitting, to a remote server over a communication network, a request for a speech-to-text transcription of the query;
  means for receiving the transcription of the query from the remote server over the communication network; and
  means for storing, in the data structure at the local device, an entry that associates an audio clip of the query with the corresponding transcription for use in recognition of a query subsequently received via the voice-user interface of the local device.

80. The system of item 71, wherein the local device receives the transcription of the audio clip of the previously received query from a remote server over a communication network prior to receiving the query via the voice-user interface at the local device.

81. A non-transitory computer-readable medium having non-transitory computer-readable instructions encoded thereon for interpreting a query received at a local device that, when executed by control circuitry, cause the control circuitry to:
  receive a query via a voice-user interface at a local device;
  generate a transcription of the query using a local speech-to-text model;
  compare the transcription to a data structure stored at the local device, wherein the data structure comprises a plurality of entries, and wherein each entry comprises an audio clip of a previously received query and a corresponding transcription;
  determine whether the data structure comprises an entry that matches the query; and
  in response to determining that the data structure comprises an entry that matches the query, identify an action associated with the matching entry.

82. The non-transitory computer-readable medium of item 81, wherein execution of the instructions further causes the control circuitry to perform the identified action.

83. The non-transitory computer-readable medium of item 81, wherein the data structure comprises a plurality of entries, and wherein each entry comprises an audio clip mapped to a phoneme, wherein the phoneme is mapped to a set of graphemes, wherein the set of graphemes is mapped to a sequence of graphemes, and wherein the sequence of graphemes is mapped to a transcription.

84. The non-transitory computer-readable medium of item 81, wherein execution of the instruction to compare the query to the data structure stored at the local device further causes the control circuitry to compare the query to an audio clip associated with each entry in the data structure.

85. The non-transitory computer-readable medium of item 81, wherein execution of the instruction to compare the query to the data structure stored at the local device further causes the control circuitry to compare the query to a plurality of graphemes associated with each entry in the data structure.

86. The non-transitory computer-readable medium of item 81, wherein execution of the instructions further causes the control circuitry to store an audio clip of the query as a second clip associated with the matching query.

87. The non-transitory computer-readable medium of item 81, wherein the query corresponds to at least one of playing, pausing, skipping, exiting, tuning, fast-forwarding, rewinding, recording, increasing volume, decreasing volume, powering on, and powering off.

88. The non-transitory computer-readable medium of item 81, wherein the query corresponds to at least one of a title, a name, or an identifier.

89. The non-transitory computer-readable medium of item 81, wherein execution of the instructions further causes the control circuitry to:
   determine that the local speech-to-text model cannot recognize the query;
   transmit, to a remote server over a communication network, a request for a speech-to-text transcription of the query;
   receive the transcription of the query from the remote server over the communication network; and
   store, in the data structure at the local device, an entry that associates an audio clip of the query with the corresponding transcription for use in recognition of a query subsequently received via the voice-user interface of the local device.

90. The non-transitory computer-readable medium of item 81, wherein the local device receives the transcription of the audio clip of the previously received query from a remote server over a communication network prior to receiving the query via the voice-user interface at the local device.

91. A method for interpreting a query received at a local device, the method comprising:
   receiving a query via a voice-user interface at a local device;
   generating a transcription of the query using a local speech-to-text model;
   comparing the transcription to a data structure stored at the local device, wherein the data structure comprises a plurality of entries, and wherein each entry comprises an audio clip of a previously received query and a corresponding transcription;
   determining whether the data structure comprises an entry that matches the query; and
   in response to determining that the data structure comprises an entry that matches the query, identifying an action associated with the matching entry.

92. The method of item 91, further comprising performing the identified action.

93. The method of any of items 91-92, wherein the data structure comprises a plurality of entries, and wherein each entry comprises an audio clip mapped to a phoneme, wherein the phoneme is mapped to a set of graphemes, wherein the set of graphemes is mapped to a sequence of graphemes, and wherein the sequence of graphemes is mapped to a transcription.

94. The method of any of items 91-93, wherein comparing the query to the data structure stored at the local device comprises comparing the query to an audio clip associated with each entry in the data structure.

95. The method of any of items 91-94, wherein comparing the query to the data structure stored at the local device comprises comparing the query to a plurality of graphemes associated with each entry in the data structure.

96. The method of any of items 91-95, further comprising storing an audio clip of the query as a second clip associated with the matching query.

97. The method of any of items 91-96, wherein the query corresponds to at least one of playing, pausing, skipping, exiting, tuning, fast-forwarding, rewinding, recording, increasing volume, decreasing volume, powering on, and powering off.

98. The method of any of items 91-97, wherein the query corresponds to at least one of a title, a name, or an identifier.

99. The method of any of items 91-98, further comprising:
   determining that the local speech-to-text model cannot recognize the query;
   transmitting, to a remote server over a communication network, a request for a speech-to-text transcription of the query;
   receiving the transcription of the query from the remote server over the communication network; and
   storing, in the data structure at the local device, an entry that associates an audio clip of the query with the corresponding transcription for use in recognition of a query subsequently received via the voice-user interface of the local device.

100. The method of any of items 91-99, wherein the local device receives the transcription of the audio clip of the previously received query from a remote server over a communication network prior to receiving the query via the voice-user interface at the local device.

What is claimed is:

1. A method for supporting a local speech processing model for transcribing a voice input into executable data, the method comprising:
   receiving the voice input via a voice-user interface of a local device;
   based on determining the received voice input is in a particular format, converting the received voice input to a different format, wherein the converted voice input in the different format comprises less data than the received voice input in the particular format;
   in response to determining that the local speech processing model cannot transcribe the converted voice input into executable data:
      transmitting, to a remote server, a request for a transcription of the converted voice input; and
      receiving, in response to the request, the transcription of the converted voice input and metadata corresponding to the converted voice input from the remote server;

storing, in a data structure at the local device, an entry that associates an audio clip of the converted voice input with the executable data corresponding to the transcription; and training the local speech processing model to recognize subsequent instances of the voice input based on the metadata corresponding to the converted voice input, wherein the local speech processing model is a machine learning model.

2. The method of claim 1, wherein the stored entry is used in recognition of subsequent voice inputs received at the voice-user interface of the local device.

3. The method of claim 1, further comprising storing a plurality of entries in the data structure, each entry corresponding to a respective transcription, wherein each entry belongs to a static set of entries or a dynamic set of entries, the static set of entries corresponding to functions executable by the local device and the dynamic set of entries corresponding to content available from a content catalog.

4. The method of claim 3, further comprising:
identifying, at the server, an update corresponding to the content catalog; and
in response to identifying the update, updating the data structure to include entries corresponding to the update;
wherein the training of the local speech processing model further comprises training the speech processing model to recognize additional words based on the update.

5. The method of claim 3, wherein each entry of the static set of entries corresponds to at least one of playing, pausing, skipping, exiting, tuning, fast-forwarding, rewinding, recording, increasing volume, decreasing volume, powering on, or powering off.

6. The method of claim 3, wherein each entry of the dynamic set of entries is a title, name, or identifier.

7. A method for supporting a local speech processing model for transcribing a voice input into executable data, the method comprising:
receiving the voice input via a voice-user interface of a local device;
in response to determining that the local speech processing model cannot transcribe the voice input into executable data:
transmitting, to a remote server, a request for a transcription of the voice input; and
receiving, in response to the request, the transcription of the voice input and metadata corresponding to the voice input from the remote server; and
storing, in a data structure at the local device, an entry that associates an audio clip of the voice input with the executable data corresponding to the transcription, wherein the entry comprises the audio clip mapped to a phoneme, wherein the phoneme is mapped to a set of graphemes, wherein the set of graphemes is mapped to a sequence of graphemes, and wherein the sequence of graphemes is mapped to the transcription.

8. The method of claim 1, further comprising:
identifying, in the data structure, an action corresponding to the transcription, wherein the action is executable by the local device; and
performing the action at the local device.

9. The method of claim 1, further comprising associating a plurality of audio clips with each entry in the data structure, wherein each audio clip corresponds to a respective voice input that is converted to a respective converted voice input, wherein each respective converted voice input corresponds to the entry, and wherein each respective voice input, prior to conversion, was received via the voice-user interface of the local device.

10. A system for supporting a local speech processing model for transcribing a voice input into executable data, the system comprising:
a local device; and
control circuitry configured to:
receive the voice input via a voice-user interface of the local device;
based on determining the received voice input is in a particular format, convert the received voice input to a different format, wherein the converted voice input in the different format comprises less data than the received voice input in the particular format;
in response to determining that the local speech processing model cannot transcribe the converted voice input into executable data:
transmit, to a remote server, a request for a transcription of the converted voice input; and
receive, in response to the request, the transcription of the converted voice input and metadata corresponding to the converted voice input from the remote server;
store, in a data structure at the local device, an entry that associates an audio clip of the converted voice input with the executable data corresponding to the transcription; and
train the local speech processing model to recognize subsequent instances of the voice input based on the metadata corresponding to the converted voice input, wherein the local speech processing model is a machine learning model.

11. The system of claim 10, wherein the control circuitry is further configured to:
identify, at the server, an update corresponding to the content catalog; and
in response to identifying the update, update the data structure to include entries corresponding to the update; and
further train the speech processing model by training the speech processing model to recognize additional words based on the update.

12. The system of claim 10, wherein the control circuitry is further configured to:
identify, in the data structure, an action corresponding to the transcription, wherein the action is executable by the local device; and
perform the action at the local device.

13. The system of claim 10, wherein the stored entry is used in the recognition of the subsequent voice inputs received at the voice-user interface of the local device.

14. The system of claim 10, wherein the control circuitry is further configured to store a plurality of entries in the data structure, each entry corresponding to a respective transcription, wherein each entry belongs to a static set of entries or a dynamic set of entries, the static set of entries corresponding to functions executable by the local device and the dynamic set of entries corresponding to content available from a content catalog.

15. The system of claim 14, wherein each entry of the static set of entries corresponds to at least one of playing, pausing, skipping, exiting, tuning, fast-forwarding, rewinding, recording, increasing volume, decreasing volume, powering on, or powering off.

16. The system of claim 14, wherein each entry of the dynamic set of entries is a title, name, or identifier.

17. The system of claim 10, wherein the entry comprises the audio clip mapped to a phoneme, wherein the phoneme is mapped to a set of graphemes, wherein the set of graphemes is mapped to a sequence of graphemes, and wherein the sequence of graphemes is mapped to the transcription.

18. The system of claim 10, wherein the control circuitry is further configured to associate a plurality of audio clips with each entry in the data structure, wherein each audio clip corresponds to a respective voice input that is converted to a respective converted voice input, wherein each respective converted voice input corresponds to the entry, and wherein each respective voice input, prior to conversion, was received via the voice-user interface of the local device.

19. The method of claim 1, wherein the machine learning model is a neural network model.

\* \* \* \* \*